United States Patent [19]
Papandreou et al.

[11] Patent Number: 5,624,131
[45] Date of Patent: Apr. 29, 1997

[54] DRIVER SIDE AIRBAG COVER

[75] Inventors: John Papandreou; Shiegeo Numata; James Froehlich, all of Patchogue, N.Y.

[73] Assignee: Izumi Corporation, Yaphank, N.Y.

[21] Appl. No.: 336,322

[22] Filed: Nov. 8, 1994

Related U.S. Application Data

[63] Continuation of Ser. No. 389, Jan. 4, 1993, abandoned.

[51] Int. Cl.$^6$ .................................................... B60R 21/16
[52] U.S. Cl. .......................................... 280/728.3; 280/731
[58] Field of Search .................................. 280/732, 731, 280/728.3, 728.1; 403/2

[56] References Cited

U.S. PATENT DOCUMENTS

| | | |
|---|---|---|
| 1,142,307 | 6/1915 | Cleve . |
| 1,262,797 | 4/1918 | Beck . |
| 1,785,897 | 12/1930 | Geyer . |
| 1,807,657 | 6/1931 | Geyer . |
| 1,825,392 | 9/1931 | Geyer . |
| 1,843,676 | 2/1932 | Husted . |
| 1,876,693 | 9/1932 | Kraft . |
| 1,967,060 | 7/1934 | Mungen . |
| 2,203,791 | 6/1940 | Lange . |
| 2,269,492 | 1/1942 | Sorensen . |
| 2,425,240 | 8/1947 | George . |
| 2,459,797 | 1/1949 | Den . |
| 2,705,816 | 4/1955 | Sampson . |
| 2,818,749 | 1/1958 | Bayko . |
| 2,863,015 | 12/1958 | Ahrens . |
| 2,889,714 | 6/1959 | Romano . |
| 2,954,708 | 10/1960 | Huzzard . |
| 3,209,615 | 10/1965 | Fosnaugh et al. . |
| 3,563,112 | 2/1971 | Wilfert . |
| 3,576,139 | 4/1971 | Conterno . |
| 3,576,141 | 4/1971 | Brilmyer . |
| 3,583,255 | 6/1971 | Cureuru . |
| 3,726,152 | 4/1973 | Tsuneizumi . |
| 3,948,118 | 4/1976 | Garbin . |
| 4,010,659 | 3/1977 | Muller et al. . |
| 4,011,643 | 3/1977 | Muller et al. . |
| 4,011,644 | 3/1977 | Muller et al. . |
| 4,011,645 | 3/1977 | Muller . |
| 4,011,772 | 3/1977 | Muller . |
| 4,011,773 | 3/1977 | Muller et al. . |
| 4,111,457 | 9/1978 | Kob et al. . |
| 4,201,830 | 5/1980 | Wollen . |
| 4,313,249 | 2/1982 | Douthwaite . |
| 4,327,601 | 5/1982 | Vivian, Jr. . |
| 4,448,091 | 5/1984 | Bauer et al. . |
| 4,541,301 | 9/1985 | Ono et al. . |
| 4,598,002 | 7/1986 | Kimura . |
| 4,604,912 | 8/1986 | Sugita et al. . |
| 4,633,734 | 1/1987 | Yano et al. . |
| 4,662,238 | 5/1987 | Zeller . |
| 4,709,944 | 12/1987 | Hongo et al. . |
| 4,753,129 | 6/1988 | Ishida et al. . |
| 4,892,006 | 1/1990 | Endo et al. . |

(List continued on next page.)

FOREIGN PATENT DOCUMENTS

| | | |
|---|---|---|
| 0394710 | 10/1990 | Germany . |
| 887330 | 7/1981 | U.S.S.R. . |
| 9118769 | 12/1991 | WIPO .............................. 280/728 B |

*Primary Examiner*—Eric D. Culbreth
*Attorney, Agent, or Firm*—Stephen E. Feldman

[57] ABSTRACT

A cover for an air bag which comprises a lid portion devoid of any weakened portions or lines, and mounting side wall portions having outer and inner ends. The outer ends are connected to the lid portion. The mounting side wall portions include upper and lower members and a pair of lateral members. The upper member and both the lateral members have connecting portions adapted for connection to a fixed part of a vehicle or another part. The connecting portions of the lateral members operate in such a manner that they detach from the fixed part of the vehicle or another part when the air bag is deployed. The connecting portions of the upper member remains attached to the fixed part of the vehicle or another part when the connecting portions of the lateral members detach from the fixed part of the vehicle or another part when the air bag is deployed.

5 Claims, 3 Drawing Sheets

U.S. PATENT DOCUMENTS

| | | |
|---|---|---|
| 4,920,821 | 5/1990 | Shinto et al. . |
| 4,938,500 | 7/1990 | Nakazato et al. . |
| 4,943,027 | 7/1990 | Nakayama . |
| 4,962,947 | 10/1990 | Nagata et al. . |
| 4,976,801 | 12/1990 | Martine et al. . |
| 4,989,897 | 2/1991 | Takada . |
| 5,040,646 | 8/1991 | Drefahl . |
| 5,060,972 | 10/1991 | Satoh et al. ............................ 280/732 |
| 5,062,661 | 11/1991 | Winget ................................... 280/731 |
| 5,062,663 | 11/1991 | Satoh . |
| 5,064,217 | 11/1991 | Shiraki . |
| 5,092,627 | 3/1992 | Igawa . |
| 5,097,720 | 3/1992 | Drefahl . |
| 5,141,247 | 8/1992 | Barth . |
| 5,217,250 | 6/1993 | Sakata ................................ 280/732 B |

5,624,131

DRIVER SIDE AIRBAG COVER

This application is a continuation of application Ser. No. 08/000,389 filed Jan. 4, 1993 abandoned.

BACKGROUND OF THE INVENTION

1. Field of the Invention

The present invention relates to a cover for an air bag disposed on the hub of a steering wheel used in automobiles.

2. Prior Art

In order to reduce personal injuries resulting from most types of automobile accidents, seat belts were installed in passenger vehicles for individuals driving and riding in the vehicle. Although the use of individual seat or safety belts did help reduce personal injuries in most types of vehicle accidents, the driver of the vehicle and the passenger in the front seat of the vehicle, were often thrust forward and injured, particularly in the case of a head-on-collision, when the vehicle comes to a sudden stop. Injury is commonly suffered, because the seat belt, even though properly used, often failed to accord the necessary body restraint to guard against striking or impacting against the steering wheel, the dash board or instrument panel, due to the close proximity of the driver to the steering wheel and the close proximity of the passenger to the instrument panel, respectively.

To provide additional occupant protection, inflatable air bags were installed in such passenger vehicles, to protect the driver and passenger in the front seat. An air bag would be disposed in the hub of the steering wheel to protect the driver and another air bag would be disposed in the instrument panel, in front of the front seat passenger, to protect this passenger. When an accident occurs during driving, a release mechanism is activated by the impact of the vehicle and the folded air bag in the steering wheel and the folded air bag in the instrument panel are inflated rapidly. The persons in the front seat of the vehicle, who are thrown forward by the sudden deceleration of the vehicle, are caught by these inflated air bags, before they impact against any hard objects or sharp edges, and especially before they hit the windshield of the vehicle. The inflation of the folded air bag can be effected in a conventional manner by a gas container or generator. Air bags which are automatically inflated during accidents have the advantage, compared to safety belts alone, in that the latter are only activated by specific actions taken on the part of the occupants in the vehicle, i.e. properly positioning and locking the seat belts. In contrast, air bags are kept ready to immediately function independent of such actions, and they do not inhibit freedom of movement of the occupants in the vehicle.

In the past, when a driver side air bag was inflated, a weakened line on the lid portion of the cover would rupture and the air bag would be deployed. However, sometimes when the air bag deploys in this type of design, the cover breaks into small pieces, scattering and flying into the face of the driver opposite it and/or in the face of the occupants of the vehicle. Another associated problem existing when the air bag deploys, is that forces of considerable magnitude operate on the mounting side wall portions of the air bag cover or those portions of the air bag cover which are affixed to the fixed part of the vehicle.

A proposed solution to this breakage problem was to design a cover having a two layer lid portion comprising, a soft outer surface layer and a rigid inner core layer to which the soft outer surface layer is bonded to; this design obviates the aforementioned problems, in that, as the air bag deploys, the rigid inner core layer is prevented from breaking into small pieces by the outer adhering soft layer. However, such a design has certain problems associated therewith. Among them, is that adequate bonding or adhesion between the two layers is difficult to achieve, because of the extensive contact area between these two layers.

A solution to the breakage problem was to design a unitary cover which substantially eliminated the possibility of the lid portion of the cover, from breaking into small pieces, and scattering within the occupant compartment portion of the vehicle, when the air bag deploys. Such a unitary cover comprises a lid portion having a weakened line which opens when the air bag is deployed. The mounting side wall portions have upper and lower ends, the upper ends of which are connected to the lid portion and the lower ends are adapted for connection to a hub of a steering wheel. The cover is an integral structure. The lid portion comprises a flexible and soft layer, whereas the mounting side wall portions comprise a rigid layer; the two layers are united at their points of contact or where their materials come together. Such a cover is disclosed in U.S. patent application Ser. No. 07/955,419, filed Sep. 22, 1992 entitled "Air Bag Cover And Method Of Manufacturing The Cover".

Accordingly, it is an object of this invention, to provide an improved driver side air bag cover, used in an automobile.

Another object of the present invention is to provide an improved driver side air bag cover, which deploys, in a safe and reliable manner, when the air bag inflates.

A still further object of the present invention, is to provide a driver side air bag cover, which eliminates the possibility of the lid portion of the cover, from breaking into small pieces, and scattering within the occupant compartment portion of the automobile, when the air bag deploys.

A further object of the present invention, is to provide a driver side air bag cover, having lateral mounting side wall portions, which detach from the base plate they are attached to, and an upper mounting side wall portion, which remains attached to the base plate, when the air bag deploys.

SUMMARY OF THE INVENTION

The present invention relates to a cover for an inflating type occupant restraint device such as an air bag used in a vehicle.

In its broader aspects, the cover comprises a lid portion which is devoid of any weakened portions or lines and mounting side wall portions having outer and inner ends, the outer ends connected to the lid portion. The mounting side wall portions comprise upper and lower members and a pair of lateral members. One of the upper and lower members and both the lateral members have connecting means adapted for connection to a fixed part of a vehicle or another part. The connecting means of the lateral members function to detach from the fixed part of the vehicle or another part when the inflating type occupant restraint device is deployed. The connecting means of one of the upper and lower members function to remain attached to the fixed part of the vehicle or another part, when the connected means of the lateral members detach from the fixed part of the vehicle or another part.

In its narrower aspects, the cover comprises a lid portion which is devoid of any weakened sections or lines and mounting side wall portions having outer and inner ends, the outer ends connected to the lid portion. The mounting side wall portions comprise upper and lower members and a pair of lateral members. The upper member and both the lateral members have connecting means adapted for connection to a fixed part of a vehicle or another part. The connecting means of both the lateral members function to detach from the fixed part of the vehicle or another part when the inflating type occupant restraint device is deployed. The connecting means of the upper member function to remain attached to the fixed part of the vehicle or another part when the connected means of the lateral members detach from the fixed part of the vehicle or another part. The connecting means of the lateral members comprise two spaced apart portions of reduced thickness at the inner end of the lateral members. The portions of reduced thickness each form a tearing portion which opens along the tearing portion when the air bag is deployed.

The tearing portion has a height which increases inwardly and an aperture formed in an outward section thereof. The tearing portion is substantially triangularly shaped and the apex of which is disposed at or near the aperture. The upper member comprises an L-shaped bracket. This bracket comprises a first flexible member connected to the inner surface of the lid portion, and a second member connected to the fixed part of the vehicle or another part. The first member permits the lid portion to pivot outwardly when the air bag is deployed. The lateral members are in the form of flexible, flat, elongated members. The mounting side wall portions form a generally rectangular configuration in cross section.

Other objects, features and advantages of the present invention will become apparent from the subsequent description and the appended claims taken in conjunction with the accompanying drawings.

DETAILED DESCRIPTION OF THE PREFERRED EMBODIMENT

Figure 5:
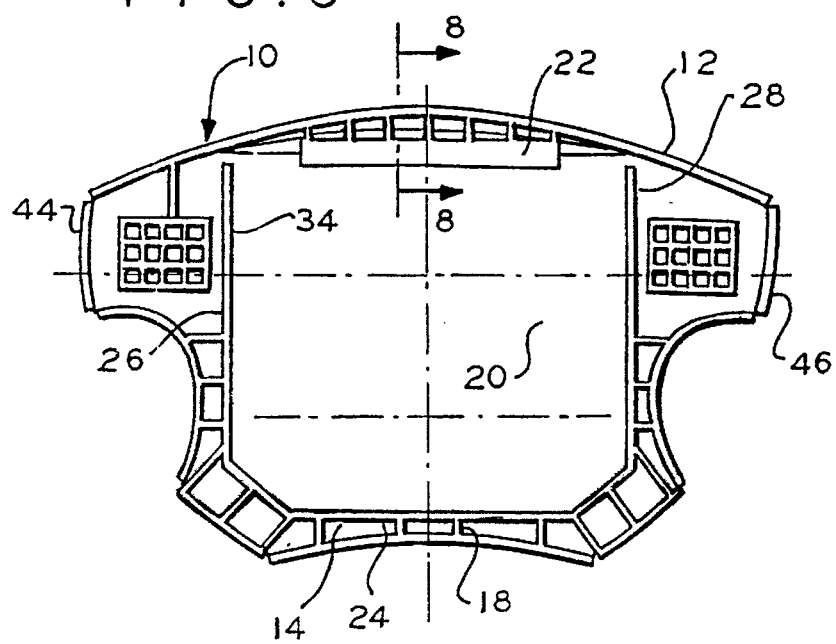
FIG. 5 is a bottom plan view of the cover shown in FIG. 1.
Figure 6:
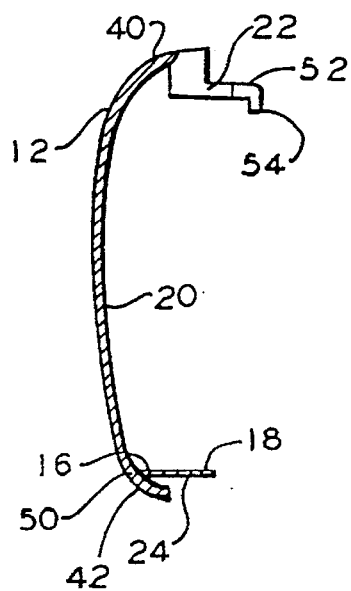
FIG. 6 is a sectional view taken along line 6—6 of FIG. 1.
Figure 7:
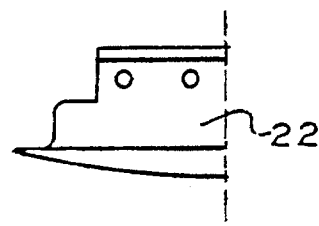
FIG. 7 is a rear plan view of half of the upper member of the cover shown in FIG. 5.

Referring to FIGS. 1–10, the cover is generally designated by reference numeral 10 and comprises, a lid portion 12, and mounting side wall portions or side walls 14, connected to said lid portion 12. The mounting side wall portions 14 have outer and inner ends, 16 and 18, respectively, the outer ends of which are connected to the inner surface 20 of the lid portion 12. As is best shown in FIG. 5, the side walls 14 form a generally rectangular configuration in cross section. The mounting side wall portions 14 comprise, an upper member 22, a lower member 24, and a pair of lateral members 26 and 28. The inner ends 18 of the upper member 22 and the pair of lateral members 26 and 28 are connected to a fixed part of a vehicle or another part, the latter being a base plate 30 (FIG. 10), which is supported by a hub of a steering wheel (not shown), the fixed part of a vehicle; the base plate 30 accommodates an air bag (not shown) which is in a folded state between it and inner surface 20 of the lid portion 12 bounded by the side walls 14. More specifically, the upper member 22 and the lateral members 26 and 28, all include connecting means 32, 34 and 36, respectively, which connecting means (discussed in more detail below), are adapted for connection to the base plate 30. The connecting means 34 (only one of which is shown) of the lateral members 26 and 28, respectively, function or operate in such a manner that they detach (or are torn) from the base plate 30 when the air bag is deployed. However, the connecting means 32 of the upper member 22 functions or operates in such a manner that the upper member 22 remains attached to the base plate 30 when connecting means 34 and 36 of the lateral members 26 and 28, respectively, are detached or torn from the base plate 30 when the air bag deploys.

The lid portion 12 comprises, a top section 38, upper and lower sections 40 and 42, respectively, and a pair of lateral sections 44 and 46. The upper and lower sections 40 and 42, respectively, comprise upper and lower arcuate sections 48 and 50.

Figure 1:
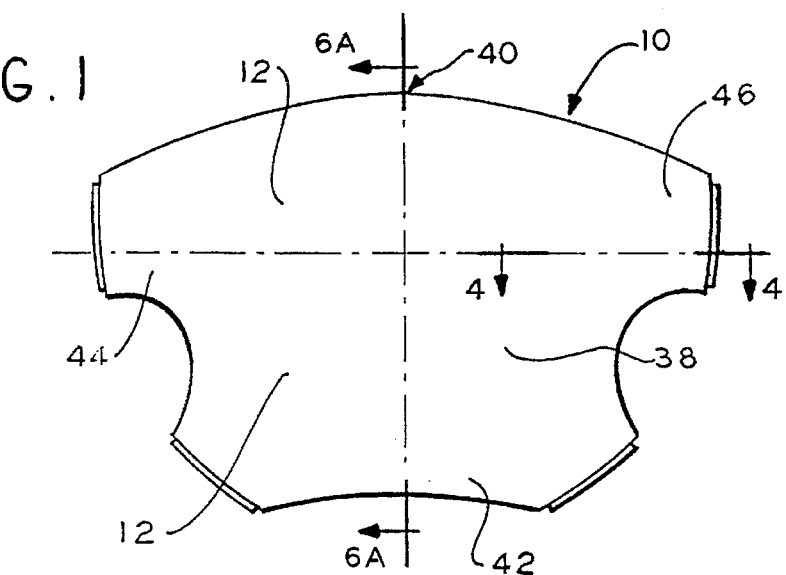
FIG. 1 is a front plan view of the cover for an air bag in accordance with the present invention.
Figure 3:
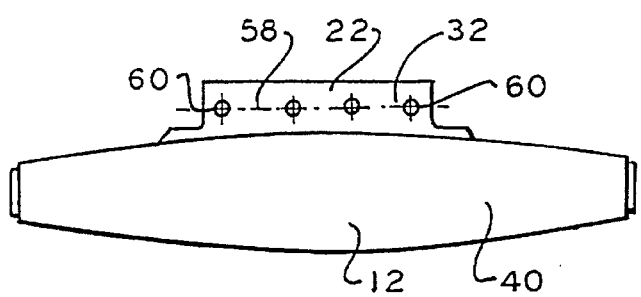
FIG. 3 is a top plan view of the cover shown in FIG. 1.
Figure 4:
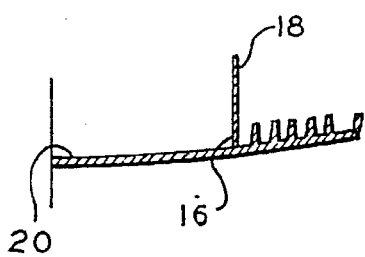
FIG. 4 is a sectional view taken along line 4—4 of FIG. 1.
Figure 2:
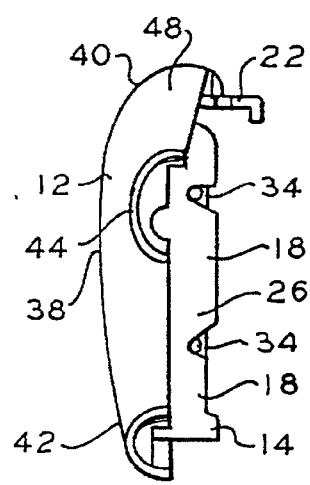
FIG. 2 is a right side view of the cover shown in FIG. 1.
Figure 8:
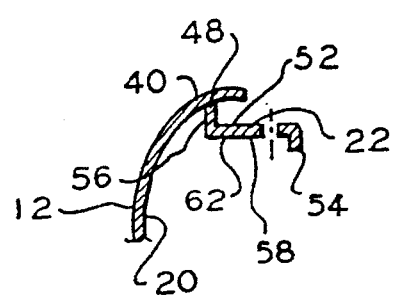
FIG. 8 is sectional view of the upper member and a section of the lid portion attached thereto taken along line 8—8 of FIG. 5.

Referring now to FIGS. 3, 5 and 8 wherein the details of the upper member 22 are shown, it comprises an L-shaped bracket 52 (FIG. 8) and a downwardly disposed flange 54. A plurality of spaced apart webs 55 (FIG. 5) connect the bracket 52 to the inner surface 20 of the lid portion 12 at its upper section 42. The L-shaped bracket 52 itself comprises a downwardly disposed first flexible member 56 connected to the inner surface 20 of the upper section 40 of the lid portion 12 and a relatively rigid, inwardly extending, second member 58, with the flange 54 at its end. Referring now to FIG. 3, the second member 58 is shown laterally extending and having a plurality of apertures 60 extending there through to the underside 62 (FIG. 8); those portions of the second member 58 which define the plurality of apertures 60 constitute the connecting means of the upper member 22. When conventional attaching means (i.e. bolts and nut) are inserted through these apertures 60 and corresponding apertures 63 in the base plate 30, they secure the upper member 22 thereto, and it remains attached to it even when the lateral members 26 and 28 are torn therefrom.

Figure 9:
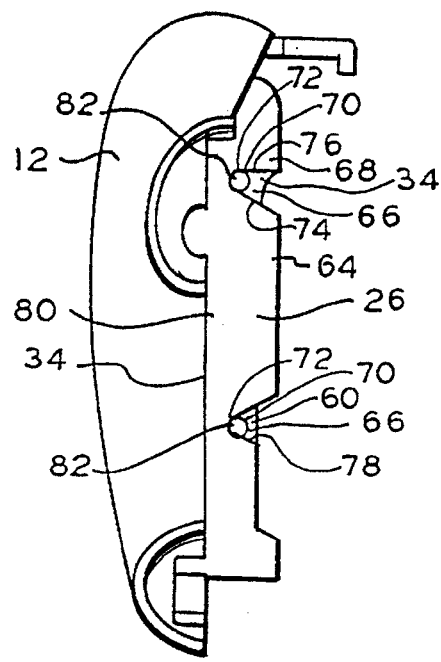
FIG. 9 is an enlarged right side view of the cover shown in FIG. 1.

Referring now to FIG. 9, which illustrates in an enlarged view, one (the left) of the two identical lateral members 26 and 28. The lateral member 26 is made of a flexible material and is in the form of a flat, elongated, rectangular member. Two, spaced apart, connecting means 34, are formed at the inner end 64 of the lateral member 26. Each of the connecting means 34 comprise weakened portions or portions of reduced thickness 66. These portions 66 form tearing portions 68 which open or tear when the air bag is deployed. An aperture 70 is formed in an outward section 72 in each of the portions of reduced thickness 66. The upper of the two portions of reduced thickness 66 is substantially triangularly shaped and generally forms a right triangle with a leading lower end 74 and a lagging upper end 76. The lower of the two portions of reduced thickness 66 is also substantially triangular shaped and generally forms an equilateral triangle with a leading lower edge 78 and a lagging upper end 80. The apex 82 of each triangular shaped portion of reduced thickness 66 is disposed at or near the aperture 70 formed therein and the height of each portion of reduced thickness 66 increases inwardly.

Figure 10:
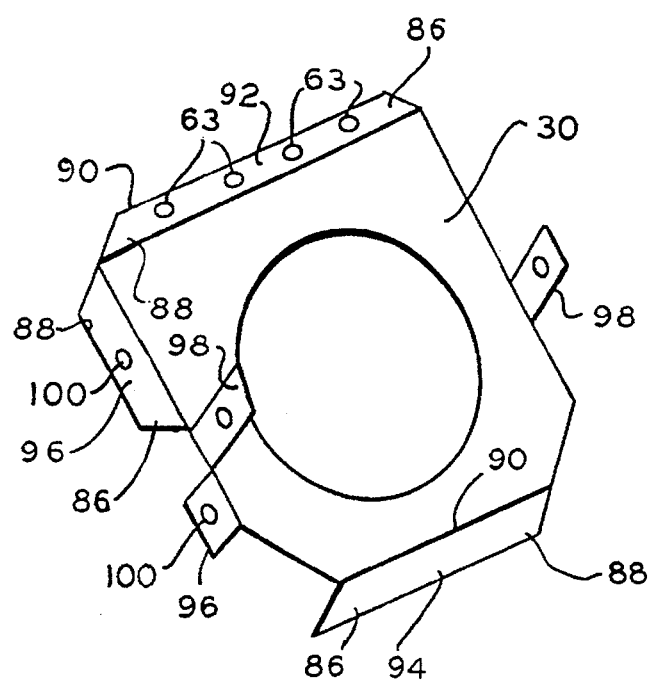
FIG. 10 is a perspective view of the base plate which is connected to the underside of the cover shown in FIG. 5.

Referring now to FIG. 10 which illustrates the base plate 30 it is preferably made of aluminum metal. The base plate 30 comprises, a ring plate 84 and mounting side wall portions or side walls 86 (only three of which are shown in said figure). The side walls 86 have outer and inner ends, 88 and 90, respectively. The side walls 86 comprise, an upper member 92, a lower member 94 and a pair of two-section lateral members 96 (only one of which is shown). Disposed between each of the two-section lateral members 96 are inwardly extending tabs 98 connected to the hub of a steering wheel (not shown). Each section of the two-section lateral members 96 has an aperture 100 formed therein. The mounting side walls 86 of the base plate 30 nests within their corresponding mounting side wall portions 14 of the lid portion 12. As previously discussed, the upper member 22 of the cover 10 is securely attached to the base plate 30 through its upper member 92; that is conventional attaching means (i.e. bolts and nuts) are inserted through apertures 63 in its upper member 92 and through apertures 60 of its upper member 22. The lateral members 96 of the base plate 30 are loosely attached to the lateral members 26 and 28 of the cover 10; that is conventional attaching means (ie. bolts and nuts) are inserted through apertures 70 in the lateral members 26 and 28 and through apertures 100 of the two-section lateral members 96, to loosely attach the lateral members to each other. Accordingly, the pair of lateral members 26 and 28 are permitted to move a slight amount laterally. Those portions of the lateral members 26 and 28 which define the apertures 70 and the weakened portions or portions of reduced thickness 66, constitute the connecting means 34 and 36, respectively. As previously generally discussed, the connecting means 34 and 36 of the lateral members 26 and 28, respectively, function or operate in such a manner that they detach or are torn from the base plate 30 when the air bag is deployed. More specifically, when the air bag is deployed, it presses against the inner surface 20 of the lid portion 12 forcing it outward. At the same time, the lateral members 26 and 28 attached to the lid portion 12 are forced outward resulting in the weakened portions 66 being torn by the attachment means inserted through their apertures 70 and the apertures 100 of the base plate 30 fixed to the steering wheel hub. Since the upper member 22 of the cover 10 is securely attached and affixed to the upper member 92 of the base plate 30, it remains attached to the base plate 30 when the air bag is deployed. This results in the lateral members 26 and 28 being released thereby pivoting the cover 10 outward and upward to allow the air bag to be fully deployed against the driver of the vehicle.

It is to be understood that various changes and modifications can be made in the invention without departing from the scope of the invention as defined by the appended claims.

We claim:

1. A cover for an automotive inflating occupant restraint device, comprising:

a lid portion; and mounting side wall portions having outer and inner ends, said outer ends connected to said lid portion, said mounting side wall portions comprising,
   an upper, a lower and a pair of lateral members,
   one of said upper, and lower members and said lateral members having connecting means adapted for connection to a fixed part of a vehicle or another part, said connecting means of said lateral members for detaching from said fixed part of said vehicle or said other part when said automotive inflating occupant restraint device is deployed, wherein said connecting means of said lateral members comprise at least one portion of reduced thickness at the inner end of said lateral members forming a tearing portion which opens along said tearing portion when said inflating occupant restraint device is deployed, wherein said portion of reduced thickness has a height which increases inwardly, and said connecting means of one of said upper and lower members for remaining attached to said fixed part of said vehicle or said other part when said connecting means of said lateral members detach from said fixed part of said vehicle or said other part.

2. A cover for an automotive inflating occupant restraint device, comprising:

A lid portion; and mounting side wall portions having outer and inner ends, said outer ends connected to said lid portion, said mounting side wall portions comprising,
   an upper, a lower and a pair of lateral members,
   one of said upper and lower members and said lateral members having connecting means adapted for connection to a fixed part of a vehicle or another part, said connecting means of said lateral members for detaching from said fixed part of said vehicle or said other part when said automotive inflating occupant restraint device is deployed, therein said connecting means of said lateral members comprise at least one portion of reduced thickness at the inner end of said lateral members forming a tearing portion which open along said tearing portion when said inflating occupant restraint device is deployed, wherein an aperture is formed in said portion of reduced thickness, said aperture being formed in an outward section of said portion of reduced thickness, said portion of reduced thickness having a triangular shape with an apex, wherein said apex of said triangular shaped portion of reduced thickness is disposed at or near said aperture, and said connecting means of one of said upper and lower members for remaining attached to said fixed part of said vehicle or said other part when said connecting means of said lateral members detach from said fixed part of said vehicle or said other part.

3. A cover for an automotive inflating occupant restraint device, comprising:

a lid portion devoid of any weakened portions or lines; and mounting side wall portions having outer and inner ends, said outer ends connected to said lid portion, said mounting side wall portions comprising,
   an upper, a lower and a pair of lateral members,
   one of said upper and lower members and said lateral members having connecting means adapted for connection to a fixed part of a vehicle or another part, said connecting means of said lateral members for detaching from said fixed part of a vehicle or another part when said automotive inflating occupant restraint device is deployed, wherein said connecting means of said lateral members comprise at least one portion of reduced thickness at the inner end of said lateral members forming a tearing portion which opens along said tearing portion when said inflating occupant restraint device is deployed, wherein said portion of reduced thickness has a height which increases inwardly, and said connecting means of one of said upper and lower members for remaining attached to said fixed part of a vehicle or another part when said connecting means of said lateral members detach from said fixed part of a vehicle or said other part.

4. A cover for an automotive inflating occupant restraint device, comprising:

a lid portion devoid of any weakened portions or lines; and mounting said wall portions having outer and inner ends, said outer ends connected to said lid portion, said mounting side wall portions comprising,
an upper, a lower and a pair of lateral members,
one of said upper and lower members and said lateral members having connecting means adapted for connection to a fixed part of a vehicle or another part, said connecting means of said lateral members for detaching from said fixed part of a vehicle or another part when the automotive inflating occupant restraint device is deployed, wherein said connecting means of said lateral members comprise at least one portion of reduced thickness at the inner end of said lateral members forming a tearing portion which opens along said tearing portion when said inflating occupant restraint device is deployed, wherein an aperture is formed in said portion of reduced thickness, said aperture being formed in an outward section of said portion of reduced thickness said portion of reduced thickness having a triangular shape with an apex, wherein said apex of said triangular shaped portion of reduced thickness is disposed at or near said aperture, and said connecting means of one of said upper and lower members for remaining attached to said fixed part of a vehicle or another part when the connecting means of said lateral members detach from said fixed part of a vehicle or another part.

5. A cover for an automotive air bag, comprising:

a lid portion devoid of any weakened sections or lines; and mounting side wall portions having outer and inner ends, said outer ends connected to said lid portion, said mounting side wall portions comprising,
an upper, a lower and a pair of lateral members, said upper member of and said lateral members having connecting means adapted for connection to a fixed part of a vehicle or another part, said connecting means of both said lateral members for detaching from said fixed part of said vehicle or said other part when the automotive air bag is deployed, and said connecting means of said upper member for remaining attached to said fixed part of said vehicle or said other part when said connecting means of said lateral members detach from said fixed part of said vehicle or said other part, said connecting means of said lateral members comprising two spaced apart portions of reduced thickness at the inner end of said lateral members forming a tearing portion which opens along said tearing portion when said air bag is deployed, said tearing portion having a height which increases inwardly and an aperture formed in an outward section thereof, said tearing portion having a substantially triangular shape, having an apex of which is disposed at or near said aperture, said upper member comprising,
an L-shaped bracket comprising,
a first flexible member connected to the inner surface of said lid portion, and
a second member connected to said fixed part of said vehicle or another part, said first member permitting said lid portion to pivot outwardly when said air bag is deployed, said lateral members being in the form of flexible flat elongated members, and said mounting side wall portions forming a generally rectangular configuration in cross section.

* * * * *